May 9, 1933. A. VANDERVELD 1,908,382
CLOTH GRIPPER FOR MEASURING MACHINES
Filed Nov. 12, 1928 5 Sheets-Sheet 1

Inventor
Anthony Vanderveld
By Liverance &
Van Antwerp
Attorneys

May 9, 1933.    A. VANDERVELD    1,908,382

CLOTH GRIPPER FOR MEASURING MACHINES

Filed Nov. 12, 1928    5 Sheets-Sheet 2

Inventor
Anthony Vanderveld
By Liverance & Van Antwerp
Attorneys

May 9, 1933.   A. VANDERVELD   1,908,382
CLOTH GRIPPER FOR MEASURING MACHINES
Filed Nov. 12, 1928   5 Sheets-Sheet 3

Inventor
Anthony Vanderveld
By Liverance and
Van Antwerp
Attorneys

May 9, 1933.  A. VANDERVELD  1,908,382
CLOTH GRIPPER FOR MEASURING MACHINES
Filed Nov. 12, 1928   5 Sheets-Sheet 4

Inventor
Anthony Vanderveld
By Liverance &
Van Antwerp
Attorneys

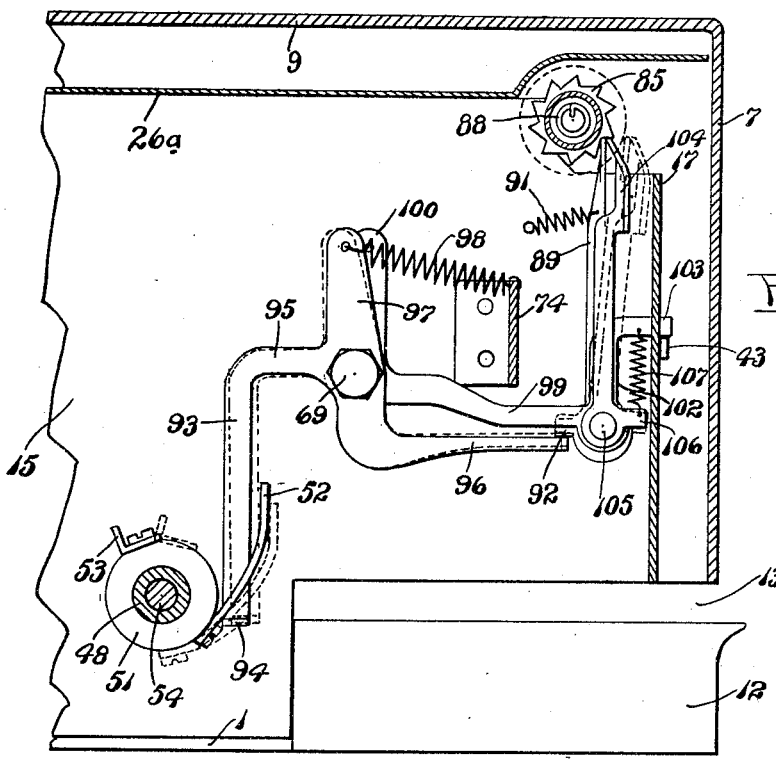

Patented May 9, 1933

1,908,382

UNITED STATES PATENT OFFICE

ANTHONY VANDERVELD, OF GRAND RAPIDS, MICHIGAN, ASSIGNOR OF ONE-HALF TO HARRY B. PARRISH, OF GRAND RAPIDS, MICHIGAN

CLOTH GRIPPER FOR MEASURING MACHINES

Application filed November 12, 1928. Serial No. 318,628.

This invention relates to a cloth gripping mechanism for measuring machines of the character shown in my previously issued patents, one having No. 1,420,612, granted June 20, 1922, another having No. 1,573,589, issued February 16, 1926; and another having No 1,676,587, granted July 10, 1928. I have obtained other patents than those identified, those noted however being examples of machines of the character to which the present invention applies.

In cloth measuring machines or in combined cloth measuring and cost computing machines of the character to which the present invention is applicable, they are designed so that the cloth or like fabric shall be pulled through the machine in the direction of its length between two rollers, one of which is a measuring roller driven by frictional engagement of the cloth therewith, and the other of which is a presser roller for holding the cloth in secure frictional engagement with the measuring roller. The measuring roller drives various indicators through interposed gearing mechanism properly designed so that when a length of goods has been pulled through the machine the indicators give exact information as to the length of goods. Machines of this character are of limited measuring capacity and ordinarily the measuring capacity is ten or twelve yards. Preferably the machine in which the present invention is to be used will have a ten yard maximum capacity of measuring at which point it will then be stopped as set forth in my previous Patent No. 1,420,612, necessitating a reset of the machine with its indicators at zero position for measuring anything additional or more than ten yards with the machine. It is, however, to be understood that the particular maximum limit of ten yards for a single measuring cycle of the machine without starting it again from zero position is not any necessary or essential feature of the invention as the maximum limit noted may either be greater or less than ten yards. Ten yards has been selected as most satisfactory.

With a machine having a limit, such as ten yards or thereabouts, it is evident that frequently a greater amount than the maximum limit may be called for by a customer. In such case the mechanism is reset with the indicators at zero position. Previously it has been the practice to hold the cloth by hand against movement while the resetting operation is taking place. The cloth being held by the operator of the machine there was liability of error inasmuch as the operator might inadvertently change the position of the cloth so that when the additional length beyond the measurement capacity of the machine was added to that first measured there was liable to be an error in the amount of goods delivered to the customer, either more or less than what was called for.

In the present invention at the end of any measurement operation which goes beyond the capacity of a single measuring operation of the machine, it is designed that a totalizing counter shall be operated which will indicate the amount of goods measured during the first part of the measurement when it is run to its limit of measurement, namely, ten yards, and then for any succeeding or additional measuring operation the regular indicator of the machine will give the additional amount over ten yards. Of course, if the machine is to measure more than twenty yards there will be two operations of the machine to its capacity limit and then a succeeding partial operation for the desired additional length. And the same will hold true for higher measurements, over thirty or forty yards, and so on.

In any case, when the cloth has been measured in the machine to an extent of the capacity limit of the machine, necessitating a reset of the machine with the indicators at zero, it is an object and purpose of the present invention that a positive mechanical clamp shall be brought into play to hold the cloth against any movement during the time that the mechanism is returning to its starting position whereby, when the succeeding portion of the measurement is begun, the cloth will not have changed position so as to change or alter in any way the amount of cloth eventually delivered to the customer.

There are many subsidiary objects and purposes and mechanisms necessary to attain the same required in order to properly accomplish the primary object and purpose of the invention, namely, clamping the cloth so that it will not change its position during the operation noted. To these ends which will hereafter be fully described, various novel mechanisms and organizations and combinations of parts have been developed and produced whereby the machine is very practical and serviceable and is fully operative under any and all conditions of cloth measurement without undue effort on the part of the operator of the machine to see that the operations are successfully accomplished. In fact, all of these subsidiary objects and purposes are attained by automatic mechanisms in the machine which are controlled and made possible by exactly the same operating or control movements of the operator which had to be performed before the present invention was applied to the machine.

An understanding of the invention and the many novel constructions which have been used to completely and successfully attain the various objects stated, as well as others which will hereafter be stated, may be had from the following detailed description taken in connection with the accompanying drawings, in which, Fig. 1 is a front elevation of a cloth measuring and computing machine, it being understood that the invention is equally applicable to either cloth measuring machines or combined cloth measuring and cost computing machines.

Fig. 9 is a fragmentary longitudinal vertical section and side elevation of the machine, the plane of said section being taken substantially on the plane of line 9—9 of Fig. 4, and looking in the direction of the arrows, and, Fig. 10 is a view similar to that shown in Fig. 9 but with the parts in a different position.

Like reference characters refer to like parts in the different figures of the drawings.

Figures 1, 2:
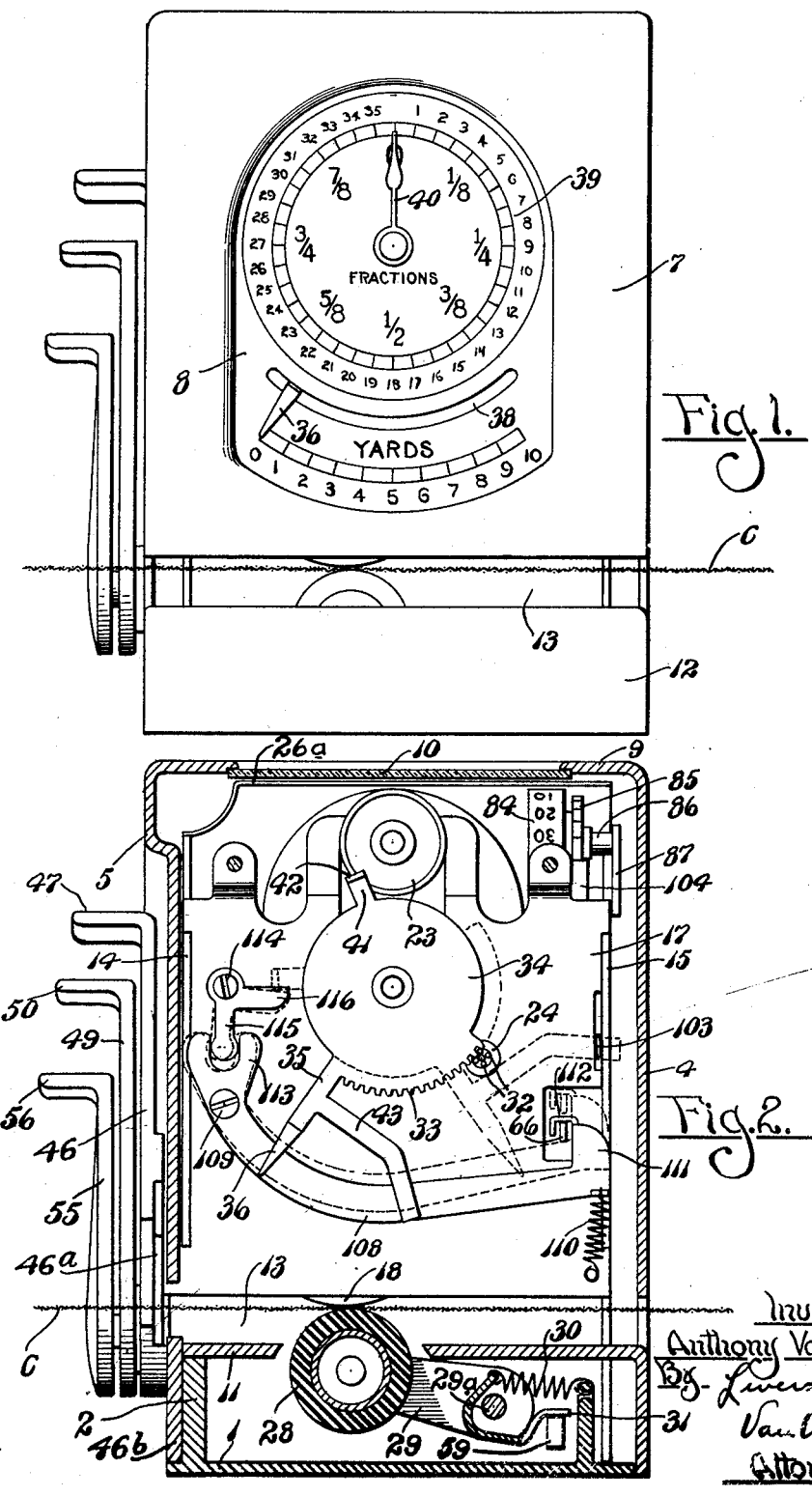
Fig. 2 is a transverse vertical section taken through the machine substantially on the plane of line 2—2 of Fig. 3, and looking toward the rear of the machine.

In the construction of the machine, a horizontal base 1 is used from which near its side and end edges vertical members 2 extend. Between the front and rear ends of the base and toward one side thereof a supporting block 3 is cast integral with said base.

An enclosing housing of metal is used with the machine comprising spaced apart vertical sides 4 and 5, a vertical back 6, a vertical front 7 which extends downward only part way to the base and in which a relatively large opening is closed by a glass front 8, and a horizontal top 9 which likewise has a large rectangular opening therein closed by a glass plate 10. The sides 4 and 5 of the housing at the front are cut away at their lower portions so as to join with the lower edge of the front 7 which is located above the base 1; and in the space left a horizontal table 11 having downwardly extending sides and front 12 is located, the sides 12 being located adjacent the vertical members 2 previously described. The upper side of the table 11 is located a distance below the adjacent lower edges of the front 7 and the sides 4 and 5 of the housing making a horizontal slot 13 which extends from the front of the machine toward the rear for approximately half of the length of the machine. This slot is known as the throat, roller pass or entrance slot of the machine and it is into this slot that the cloth is introduced for cloth measurement.

Figure 4:
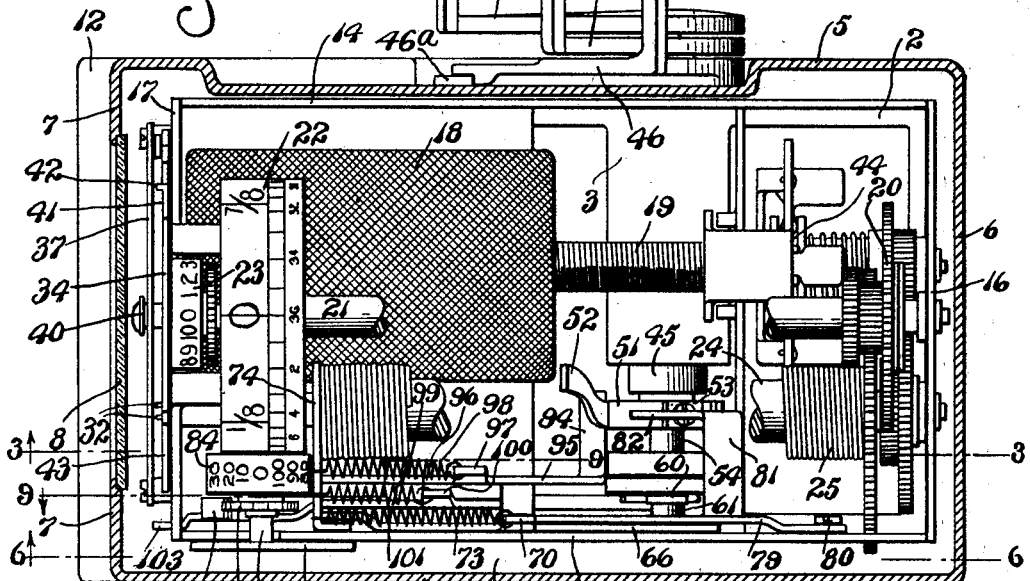
Fig. 4 is a horizontal section through the machine looking downwardly thereon substantially on the plane of line 4—4 of Fig. 3.

Within the housing is the frame which supports the mechanism of the machine. It includes spaced apart vertical sides 14 and 15 located within and substantially parallel to the sides 5 and 4 respectively, of the outer housing (see Fig. 4). A vertical back 16 is connected with and spaces the sides 14 and 15 apart and a vertical front 17 is connected with and spaces said sides apart at their front ends. The front plate 17 terminates at its lower edge in the same plane as the lower edge of the front 7 of the housing so that it does not extend into the throat or roller pass of the machine.

Figure 3:
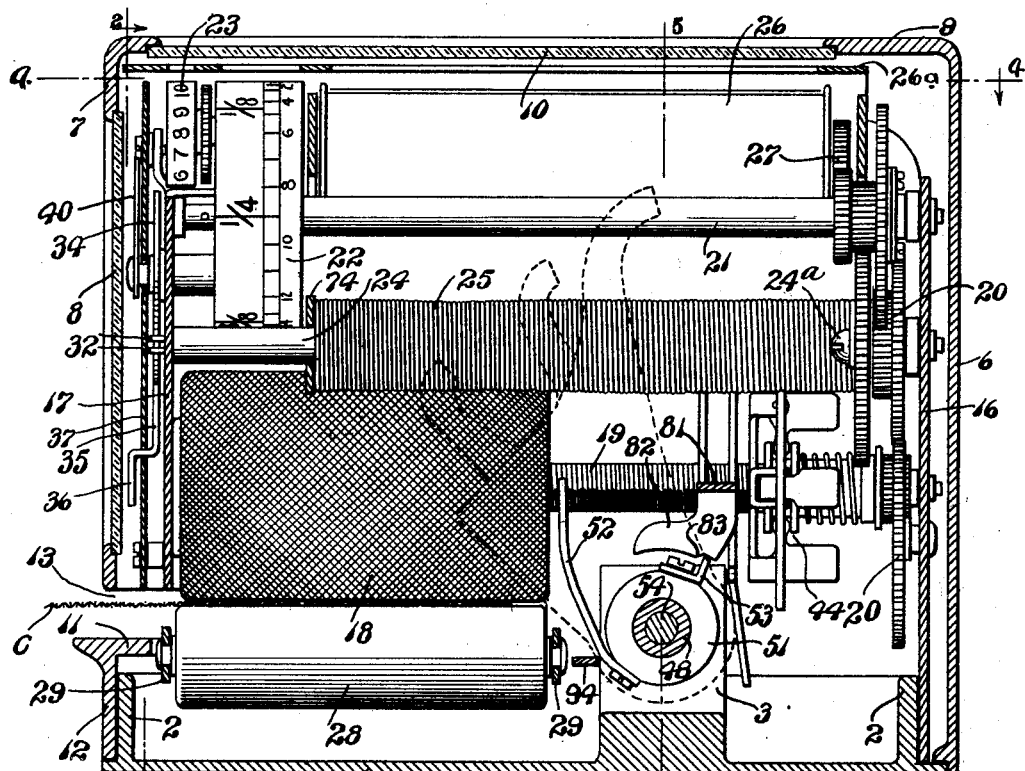
Fig. 3 is a longitudinal vertical section through the machine substantially on the plane of line 3—3 of Fig. 4.

A measuring roller 18 is located with its lower side extending slightly into the throat 13 and is fixed to a horizontal shaft 19 suitably mounted for rotation on and extending between the front and rear supporting plates 17 and 16 (see Fig. 3). Through a system of reduction gearing indicated as a whole at 20 the shaft of the measuring roller drives a horizontal shaft 21 on which, near its front end, an indicating drum 22 for inches and fractions of a yard is secured which, through mechanism which forms no part of the present invention, turns another indicating drum or wheel 23 located in front of the drum 22. The indicating wheel or drum 23 carries indications for whole units (that is, yards) of measurement and the two indicators together will show the number of yards measured and also the fractions of inches in excess of any whole number of yards and not equal to a complete yard in length.

The gearing also drives a second horizontal shaft 24 associated with and located around which is a torsion spring 25 secured at one end to one of the gears 20 by a screw 24a which gear is fixed to the shaft 24 and at the other end to a fixed part of the machine by having its end extend under a lug 25a whereby it is wound during the operation of cloth measurement so as to store power to return the mechanism to its starting position when free to do so. Above the shafts 21 and 24 is a computing chart assembly 26 driven by gearing 27 from certain of the gears 20 and over the indicating drums 22 and 23 and over the chart assembly 26 a cover plate 26a is positioned having suitable windows or openings to show measurements which have taken place and columns of computations at different prices per yard corresponding to the measurements indicated by the drums 22 and 23.

In order to drive the measuring roller 18 by cloth indicated at C (see Figs. 1, 2, 3, 6, 7 and 8), it is necessary to press the cloth securely against said roller. For this purpose a presser roller 28 is mounted below the measuring roller parallel thereto. It is mounted for rotation at one side of a tiltably mounted presser-roller frame 29 which may be tilted about the axis of a shaft 29a and which normally, under the influence of the coiled springs 30 (see Figs. 2 and 7), will move upwardly and press the cloth firmly against the measuring roller, insuring that with the longitudinal movement of the cloth through the throat or roller pass of the machine the measuring roller and associated mechanism driven thereby will be operated. The presser roller frame 29 is provided with an arm 31 extending in a direction outwardly from the shaft 29a for a purpose which will later appear.

At the front end of shaft 24 where it passes through and is rotatably mounted in the plate 17 it is provided with forwardly extending spaced apart small pins 32 which engage with a gear segment 33 located at the lower side of a disk 34 mounted on and in front of the plate 17 for rotative movements about a horizontal axis. The rotation of the shaft 24 causes rotative movements of the disk 34, the direction of the rotation of the disk being dependent upon that of the shaft. The disk is of flat metal and from its lower side at one end of the gear segment 33 an arm 35 extends downwardly which near its lower end is bent outwardly at right angles and then again downwardly and terminates in a pointer 36. A plate 37 is secured to and spaced from the front side of the flat plate 17 and it has an arc-shaped slot 38 therein through which the horizontal connecting portion between the pointer 36 and the arm 35 passes. The pointer 36 passes over a scale shown in Fig. 1 and the design of the gearing, diameter of the measuring roller and the like is such that for each yard of goods measured the pointer 36 passes from one indicating figure shown on the scale to the next higher.

In addition, a circular scale 39 is printed or otherwise applied to the front face of the plate 37 and over it the hand 40 moves continuously during measurement progress. The scale 39 is a scale indicating inches and fractions of a yard of measurement and the hand 40 is suitably driven by mechanism old and well known in my previous patents, such as No. 1,420,612, previously referred to, so that it passes once around the dial with each yard of measurement and indicates inches and fractions of a yard of measurement as it moves around said dial.

At the upper side of the disk 34 a short arm 41 extends radially and terminates at its free end in a forwardly turned ear 42. From the arm 35 at one side thereof, a second bent arm 43 extends as shown in Fig. 2. These arms 41 and 43 change position with the rotative movement of the disk 34 and when the limit of movement of the disk 34 in one direction is attained, that is, when the capacity limit of the machine has been reached, serve to operate certain mechanisms which will be hereafter described. The mechanism indicated at 44 (see Figs. 3 and 4) for stopping the machine when it runs back to zero or initial position under the influence of spring 25 and which snubs and reduces the speed of rotation and then properly stops the mechanism at initial or zero indicating position is the same as that shown in my Patent No. 1,573,589 previously noted. The mechanism which stops the machine at its capacity limit of measurement is the same as that shown, described and claimed in another of my prior patents having No. 1,522,763. It is not necessary to specifically describe any of these stop and speed snubbing mechanisms in the present application as they are not a part of the present invention and are fully shown and described in prior patents issued to me.

A horizontal cylindrical opening transverse of the machine is made through the block 3, in which a cylindrical sleeve 45 is rotatably mounted. At its outer end and outside of the side 5 of the housing an operating lever 46 is secured to the sleeve which at its free upper end is formed with a laterally extending operating head 47. The lever 46 in practice carries and operates a knife 46a to cooperate with a fixed knife plate 46b secured at one side 12 of the presser roller housing for notching the cloth at the end of a measuring operation by pushing the knife lever 46 in a downward direction.

Within the sleeve 45 and extending therethrough is a second smaller and longer cylindrical sleeve 48 likewise equipped at its outer end with an operating lever 49 which at its free end has an outwardly extending head 50 for manually turning the sleeve. At the inner end of the sleeve 48 and beyond the adjacent end of the sleeve 45 a member 51 is permanently secured to which, at its lower side, one end of a friction brake 52 is permanently secured, the brake extending upwardly and toward the rear end of the measuring roller 18. On pushing the reset lever in a downward direction the brake, which is not in contact with the measuring roller when the reset lever is in its upper position, is brought against the end of the measuring roller and holds the same against movement. On the member 51 at its upper side a small angle member 53 is permanently secured having one leg extending substantially radially outward therefrom.

Figure 5:
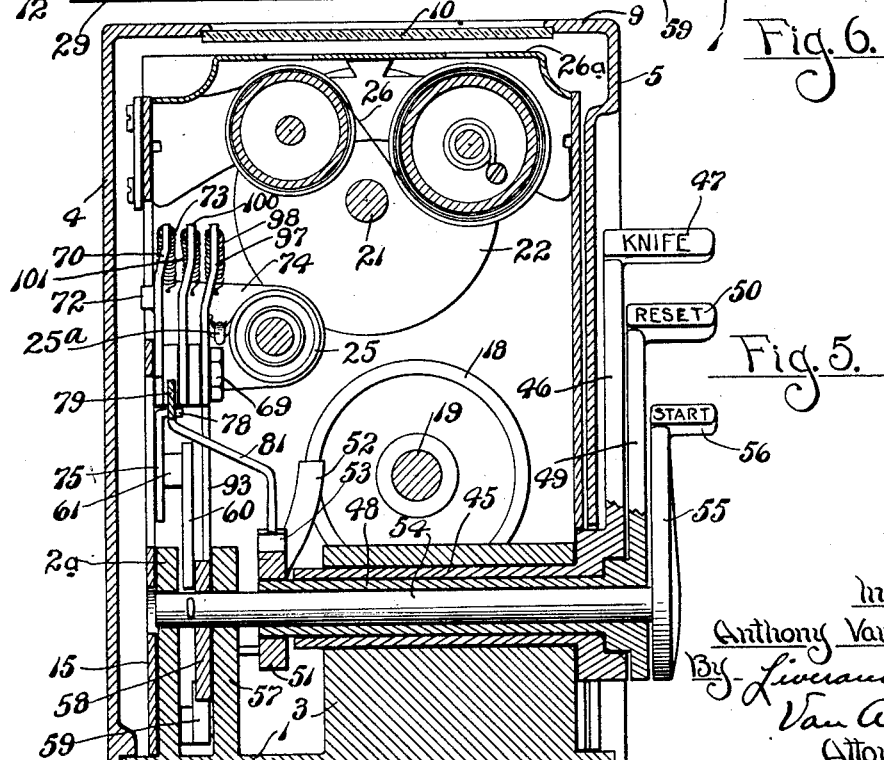
Fig. 5 is a transverse vertical section substantially on the plane of line 5—5 of Fig. 3, and looking toward the front of the machine.

Within the sleeve 48 and extending through the same is a rod or shaft 54 likewise equipped at its outer end with an operating lever 55 having an outwardly extending head 56 at its free end. The rod extends through the sleeve 48 and beyond the same and is rotatably mounted at its inner end in a post 57 integral with and extending upwardly from the base 1 and also extends through and is rotatably mounted in an upward extension 2a to the vertical member 2 on the base at one side thereof (see Fig. 5). The post 57 and the part 2a are spaced a short distance apart and between the same a cam 58 is located and secured on the rod 54. The cam bears at its lower side against one end of a lever 59 which is pivotally mounted for rocking movements at a point between its ends, the other end of the lever extending under the arm 31 of the presser roller frame. The cam has a recess 58a at its underside, as shown by Fig. 7.

Figure 6:
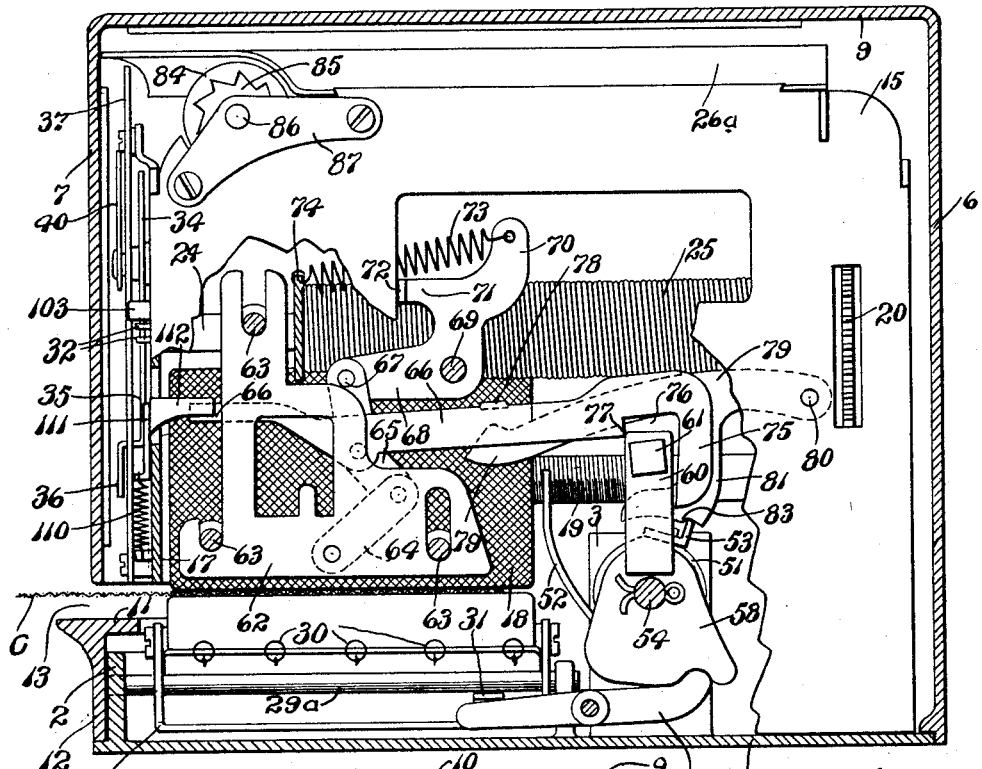
Fig. 6 is a longitudinal vertical section substantially on the plane of line 6—6 of Fig. 4, with parts broken away and shown in section for a better disclosure of the invention, and illustrating the position of the parts while cloth is being measured in the machine.
Figure 7:
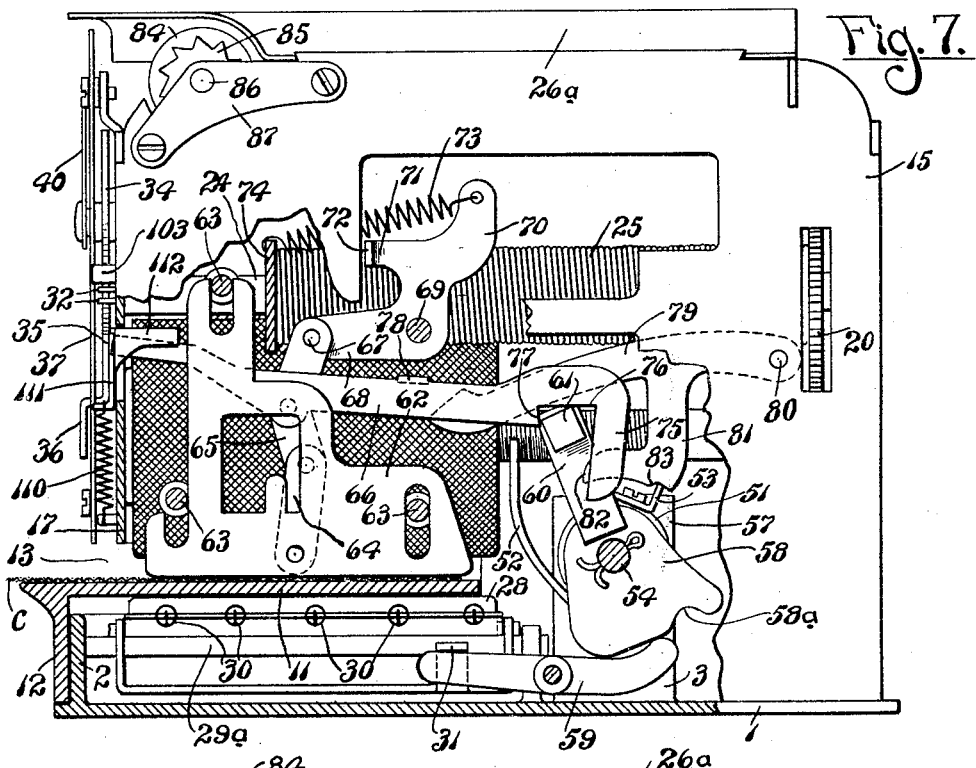
Fig. 7 is a view similar to Fig. 6 but with the outside housing of the machine removed, illustrating the position of the mechanisms after a measurement has proceeded to the capacity limit of the machine and the operation has been performed to reset the indicators at zero, with an accompanying simultaneous and automatic clamping of the cloth against movement.
Figure 8:
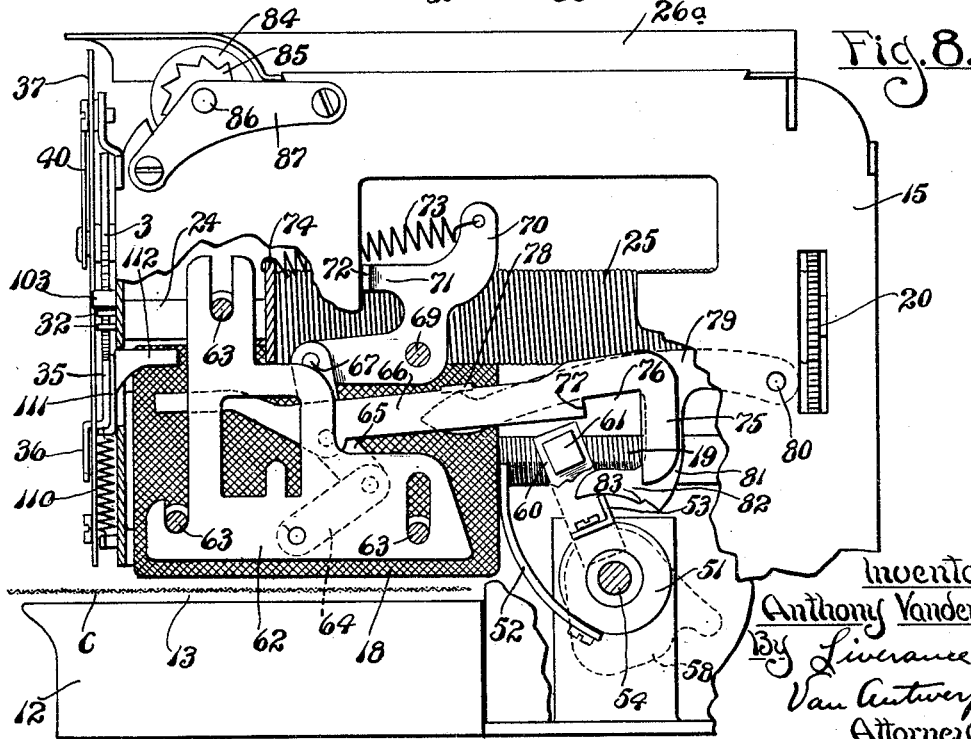
Fig. 8 is a view similar to Fig. 7 indicating the position of the mechanisms when a measurement has been completed at some point between the initial position of the mechanism and the capacity limit of the machine and the rollers have been separated and the brake operated to hold the mechanism from returning to zero indicating position.

On pushing the lever 55 in a downward direction the cam is rocked from the position shown in Fig. 6 to that shown in Fig. 7 with a consequent rocking of the presser roller frame 29 about the shaft 29a and a separation of the presser roller from the measuring roller, the presser roller being moved in a downward direction. This occurs when the rear end of the lever 59 rides out of the recess 58a in the cam; and the presser roller is held in its separated position from the measuring roller by the frictional engagement of the cam 58 and lever 59.

It is to be understood that the operation of the knife lever 46, the lever 49, which is termed the reset lever, and the lever 55, known as the start lever, are all entirely independent of each other; but that by bridging the space between the outwardly extending operating heads 47, 50 and 56 with the thumb of the operator all of the levers may be operated in succession if desired.

At the upper side of the cam 58 a bar 60 is secured which extends radially upward therefrom and carries a laterally extending block 61, preferably square in cross section, which extends toward the side 15 of the frame.

At the front and immediately inside of the side 15 of the supporting frame a clamping plate 62 is mounted for vertical movements on headed pins 63 carried by the frame side 15 (see Fig. 7), the shanks of said pins being located in slots in the clamping plate to guide the same in its vertical movements. The lower side of the plate 62 lies in a horizontal plane and is parallel to the upper side of the table 11. A link 64 is pivotally connected at one end to the clamping plate at a point substantially midway between its ends and near its lower edge and at its other end has a pivotal connection to a second link 65 which extends upwardly and in turn is pivotally connected between its ends to a floating bar 66 located substantially horizontal and lying at the inner side of the clamping plate 62 and extending back over the block 61 previously described. The upper end of the link 65, which is somewhat angular in shape, has a pivotal connection at 67 to a forwardly extending horizontal arm 68 of a bell crank lever which is pivotally mounted for rocking movements on a stud 69 fixed to and carried by the frame side 15. The other or substantially vertical arm 70 of the bell crank lever is provided at its front side with a forwardly extending horizontal projection 71 which at its free end has an outturned lip 72. A coiled spring 73 is attached at one end to the arm 70 and extends forward and is connected at its front end to a bracket 74 fastened at the inner side of the frame plate 15 and extending inwardly, the shaft 24 passing therethrough. The tendency of the spring is to turn the bell crank lever about the stud 69 until the lip 72 comes against the front edge of an opening made through the side of the frame plate 15 and into which the lip 72 extends as shown in Fig. 6.

The rear end of the bar 66 where it lies over the block 61 is raised slightly and is then turned in a downward direction, making a vertical leg 75. The lower edge portion of the bar 66 immediately in front of the leg 75 is cut away to make a recess 76 and to provide a shoulder 77 at the front end of the recess, as shown. At the upper edge of the bar 66 a lip 78 is turned inwardly at a point substantially midway between the shoulder 77 and where the link 65 is connected to said bar. The exact point of location of the lip 78, however, is not material in any way to the invention.

A lever 79 is pivotally connected at its rear end at 80 to and at the inner side of the side frame plate 15, extends forward and alongside of the rear end portion of the bar 66 and at its free front end is adapted to come underneath the lip 78 in one of the positions of the floating bar 66, as shown in Fig. 6. At the underside of the bar 79 it is provided with a downwardly and inwardly bent leg 81 which at its lower end terminates in a widener head 82, the lower edge of which is provided with a shoulder 83 and in front of the shoulder is curved in the arc of a circle whose center is the axis of the rod 54. The lower edge of the head 82 bears against the outwardly extending leg of the angle member 53, which, in one position comes back of the shoulder 83.

At the top and adjacent the front end of the machine, at a side of the indicating drum 22, a totalizing drum 84 is located being secured together with a ratchet wheel 85 on shaft 86 which is rotatably mounted in the side plate 15 and an auxiliary plate 87 attached thereto. The totalizing drum carries figures from zero to 100 at intervals of 10, the capacity limit for a single measurement of a machine being ten yards. The shaft is equipped with a spring 88, shown in Fig. 9, which normally returns the drum 84 to zero indicating position. The cover plate 26a has an opening through which the uppermost figure on the drum may be seen from above.

A holding dog 89 is engaged at its upper end with the ratchet wheel 85. It is positioned vertically at the inner side of the plate 15 and pivotally mounted at 90 at its lower end thereon being held against the ratchet wheel by spring 91 (see Fig. 10). The lower end of the dog bar 89 is formed with a rearwardly extending projection 92.

On the stud 69 previously described an irregularly shaped member is pivotally mounted. It includes at its rear end a vertical section 93 the lower end of which is provided with a laterally extending horizontal arm 94 which comes immediately in front of the friction brake member 52. At its upper end the section 93 is turned forward horizontally to make a section 95 which is mounted on the pivot 69, extends below the same and is then continued forward horizontally making the terminal section 96, the front end of which lies directly under the projection 92 of the dog bar 89. Said irregularly shaped member is also formed with an upwardly extending arm 97 directly over the pivot support 69 to which and to the bracket 74 a coiled tension spring 98 is secured, the action of which is to bring the rear edge of the arm 94 against a side of the friction brake member 52.

A third member 99 of irregular shape is also pivotally mounted on the stud 69 between the bell crank previously described and the last described irregularly shaped member. The bar 99 extends forward from the pivot. It is provided with an upwardly extending arm 100 above the pivot to which and the bracket 74, a third coiled tension spring 101 is connected. Adjacent the front end of the bar 99 it is extended upwardly for a distance, as indicated at 102, and then in a forward direction to make the terminal arm 103 which extends through a slot in the plate 17 so as to be in the path of movement of the previously described member 43 which engages with said arm 103 substantially as the capacity limit of the machine is reached in a measuring operation. A vertical operating dog bar 104 is pivotally mounted at 105 at its lower end on and at the front end of the bar 99 where it joins with the vertical member 102. The upper end of the dog bar 104 is fashioned into a dog which engages with the ratchet wheel 85. To normally hold it thereagainst, the lower end of the bar 104 is provided with a forwardly extending projection 106 and a coiled tension spring 107 connects said projection with the arm 103, as shown in Fig. 10, thereby moving the dog at the upper end of the bar 104 into engagement with the ratchet wheel 85.

A bar 108 of curved form, as shown in Fig. 2, is located in front of the front frame 17 and pivotally connected thereto at 109 near one end. Adjacent its opposite end a coiled tension spring 110 is connected thereto and to the plate 17, the tendency of which is to draw the adjacent end of the bar 103 in a downward direction. Said end of the bar 108 is provided with an upwardly extending part 111 which is formed at its upper end into a longitudinal inwardly extending substantially inverted channel member 112 extending through an opening in the front plate 17 and over the front end of the floating bar 66, previously described. The length of the channel member 112 is sufficient that it always engages with the floating bar 66 in any of its positions.

The opposite end of the bar 108 is formed with a yoke 113. A bell crank lever is pivotally mounted at 114 at the front side of plate 17 and has a downwardly extending arm 115 engaging with the yoke 113 and an inwardly extended horizontal arm 116 which lies in the path of movement of the lip 42 on the projection 41 extending radially from disk 34, whereby when the limit of measuring capacity of the machine is reached said lip engages with the arm 116 of the bell crank lever and turns the bar 108 about its pivot 109 against the force of spring 110 and lifts it from the full line position, shown in Fig. 2, to the dotted line position shown therein.

The operation of the machine described for cloth measurements less than the capacity limit of the machine is the same as in the machine made in accordance with the disclosures of my prior patents which have been noted. That is, the cloth is placed between the measuring and presser rollers which are separated to receive the cloth by movement of the "start" lever which actuates the cam 58 and the lever 59 to depress the presser roller, the mechanism being with the indicators at zero indicating position, and then the start lever 55 is turned to upper position which releases the presser roller 28 to press the cloth against the measuring roller. Drawing the cloth lengthwise through the machine operates the mechanism, moves the various indicators so as to show the progress of measurement and when the desired length of cloth has been measured the machine is stopped with the indicators showing such length and then all three levers at the side of the machine are pushed downwardly. The knife lever 46 operates the knife mechanism which notches the cloth at the end of the measurement operation of the reset lever brings the brake 52 against the measuring roller 18 and operation of the start lever 55 moves the presser roller downward and holds it separated from the measuring roller so the cloth may be removed. There is no movement of the floating bar 66 which remains in the position shown in Fig. 6. The block 61 passes underneath shoulder 77 when the start lever is operated in separating the presser from the measuring roller. The rear end of the floating bar 66 does not drop to thereby position block 61 in the recess 76 and back of the shoulder 77, but in fact it is lifted when, on operation of the reset lever, the angle member 53 rides under shoulder 83 to bring the free end of the lever 79 into position to engage with the underside of lip 78, whereby the rear end of the floating bar 66 is held against any tendency to drop to lower position.

After the cloth has thus been notched, the brake set, the rollers separated and the cloth removed, the data of the measurement and the cost of the cloth may be taken from the indicators and the chart at 26, and the machine then reset to zero by moving the reset lever 49 back to its upper position, releasing the brake and freeing the mechanism to return to its initial position under the force of spring 25. In other words, in a normal measuring operation less than the capacity limit of the machine, the cloth clamping plate 62, the floating bar 66 and the various other elements, including the totalizing counter, the bar 108 and the lever 79, are not actuated to produce any positive function in the machine, the only thing occurring being that the bar 79 is lifted somewhat but with no result needed for the operation produced.

If the measurement made on the machine is for the limit of capacity of measurement of the machine in a single operation, when the mechanism approaches its capacity limit the bar 43 engages underneath the arm 103 and the lip 42 engages against the upper side of the arm 116. The effect produced by bar 43 thus engaging with arm 103 is to lift said arm 103 and the attached parts, thereby moving the dog bar 104 upwardly and turning the totalizing counter one step so that instead of indicating zero it will indicate 10 yards thereon. At the same time the operation of the bell crank lever, which includes the arm 116, lifts the free end of the bar 108 to the dotted line position shown in Fig. 2, releasing the front end of the floating bar 66 which drops by gravity at its rear end so that the block 61 enters recess 76 and is back of the shoulder 77.

If, however, ten yards, the capacity limit, alone is to be measured on the machine and there is no need for a succeeding operation, all three levers at the side of the machine are operated in succession, the knife lever being depressed first, and as the reset lever is operated before the thumb of the operator reaches the start lever the angle member 53 rides under the shoulder 83, actuates lever 79 and lifts the rear end of the floating bar 66 to a position which carries the shoulder 77 above the block 61, and when the rollers are separated on the succeeding operation of the start lever there is no actuation of the clamping plate 62. But when the reset lever has been pushed downward with a consequent forward movement of the brake 52, the brake engages against the lateral arm 94 (see Fig. 9), and moves the irregularly shaped member, of which the arm 94 is a part, about the axis of the pivot 69, elevating the front end of the section 96 which, engaging under the projection 92, turns the dog bar 89 to the dotted line position shown in Fig. 9 away from the ratchet wheel and the upper end of the dog bar 89 being back of and engaging with the dog at the upper end of the bar 104 also moves said dog away from the ratchet wheel freeing the ratchet wheel from engagement with both of the dogs so that it may return to zero position. That is, while there are some additional movements of the mechanism in a capacity limit measurement on the machine, there is no actuation of the clamping plate and the totalizing counter is returned to its zero indicating position when all three levers at the side of the machine are operated at the end of a capacity limit measuring operation which is not to be succeeded by any additional measurement of goods.

If the machine is to be used to measure more than the capacity limit of measurement which the machine has in a single operation, when the machine has been run up to its capacity limit, in this case ten yards, the totalizing counter is moved one step through the engagement of the bar 43 with the arm 103, as previously described. The free end of bar 108 is lifted thereby permitting the front end of the floating bar 66 to follow it as it moves upwardly with a consequent dropping of the rear end of the bar 66 with an entrance of the block 61 into the recess 76 back of the shoulder 77. All that is needed if additional cloth is to be measured and added on to the ten yards already measured is to reset the mechanism to zero indicating position. This is done by pressing downwardly on the start lever alone to separate the measuring and presser rollers, care being taken not to operate the reset lever, whereupon the measurement roller being freed of the pressure of the presser roller is rotated along with all of the mechanism connected therewith back to its initial or starting position, this return rotation being accomplished by action of the spring 25, and the mechanism is stopped with the indicating pointer 36, hand 40 and the drums 22 and 23 in zero indicating positions. Because the brake 52 has not been set and there has been no movement of the member 51 to which it is attached, the angle member 53 remains back of the shoulder 83, the free end of the bar 79 has not been lifted, there has been no movement imparted to the arm 94, so that the totalizer is not returned to its original zero position, but indicates ten yards or the capacity limit of the measurement of the machine, and the rear portion of the floating bar 66 remains in its lower position with block 61 in recess 76 to engage against the shoulder 77 and positioned to move the floating bar 66 in a forward direction as the arm 60 is turned forwardly as the start lever is operated to its down position.

The forward movement of the arm 60 and the attached block 61 is illustrated in Fig. 7. Such movement carries the link 65 with the bar 66 and causes a rotation of the link 64 about the pivot at its lower end, whereupon there is a straining of the toggle made by the two pivotally connected links 64 and 65 and a consequent downward movement of clamping plate 62. The lower edge of the clamping plate accordingly is brought against the upper side of the cloth and the cloth is clamped between it and the upper side of the table 11. The cloth is thus clamped against the table and cannot move and will not be accidentally or otherwise changed in its position during the time that the measuring and presser rollers are separated, and while the mechanism is returned to zero indicating position. The ear at 72 will be moved away from the edge of the opening against which it normally bears in proportion to the thickness of the cloth disposed between the lower edge of the clamping plate and upper side of the table, as shown in Fig. 7.

When the mechanism has returned to zero indicating position, after the operation described, and upon separation of the two rollers, accompanied by clamping the cloth to the table, it is evident that the bar 108, is released, also the arm 103 is permitted to drop to its normal lower position, thereby carrying the operating dog bar 104 to the next lower tooth on the ratchet wheel for it to be in position to move the totalizing indicator drum 84 still another step should an additional capacity limit operation of the machine be performed.

The start lever may be returned to upper position bringing the presser roller against the underside of the cloth and again pressing it against the measuring roller while the backward movement of the bar 60 and the block 61 thereon causing said block to engage against the depending leg 75 moves the floating bar 66 back to its original position with a consequent lifting of the clamping plate 62. Any additional measurement may then be performed on the machine and the cloth will start with the additional measurement at exactly the same place that it ended with when the capacity limit of the machine was reached.

As many complete capacity limit operations on the machine may be performed as are necessary for the length of cloth purchased. In every case when an additional length of cloth is to be measured beyond a capacity limit measurement, as for instance either ten yards, twenty yards, thirty yards, and the like, instead of operating all three levers at the side of the machine, at each capacity limit operation of the machine only the start lever is operated, being pressed down to separate the rollers and free the machine for return to zero indicating position. But when the final measurement operation is completed either at the limit of measuring capacity of the machine, or before such limit is reached, all three levers at the side of the machine are operated in succession; the knife lever first, the reset lever immediately afterward, and the start lever at the end, in which case, as previously described, there will be no actuation of the clamping plate 62 and there will be a clearing of the totalizing counter drum 84.

It is evident from the foregoing that a machine is provided by means of which any desired length of cloth may be measured without error in the measurement. The limit of measuring for the machine at a single operation is placed at ten yards for the reason that the computation for either ten yards or a multiple thereof at any price is very simple and may be readily added to the price which appears on the computation chart for any length over ten yards or multiple thereof. The total length measured will be that shown by the indication on the drum 84 plus what is shown by the other indications on drums 22 and 23.

The operation of the machine is simple and easily learned. When it is for a measurement less than the capacity limit of the machine for a single measuring operation, the operation is changed in no respect from what it has been previously in the machines illustrated in my prior patents. When the measurement is to be over ten yards, or the capacity limit of the machine, for one measuring operation, the only thing that the operator has to learn is that when a ten yard measurement is reached only the start lever is to be pressed down and when the mechanism has run back to zero indicating position again raised so as to bring the presser roller to its upper operative operation, continuing the measurement until the desired length of cloth has been measured.

The construction is very practical, durable and efficient and has proved exceptionally satisfactory in use insuring as it does an ability to measure long lengths of cloth greater than can be measured in a single measuring operation of the machine, with assurance that the cloth will not be changed in position during the time that the mechanism is being returned to zero position after a ten yard measurement, and removing entirely the human factor and errors which are liable to occur by reason thereof. The secure clamping of the cloth against movement during the time that the mechanism is being returned to zero at the end of a measurement which has gone to the limit of measuring of the machine is practically attained.

The invention is fully defined in the appended claims and is to be considered comprehensive of all forms of structure coming within their scope.

I claim:

1. In a cloth measuring machine, in combination with a measurement indicator, measuring mechanism for operating the same, means for returning said measurement indicator to zero indicating position, means for registering the capacity limit of measurement of the machine on operating the machine to its capacity limit of measurement, and means for holding the cloth being measured in the machine against movement when said measurement indicator is returning to zero indicating position, whereby the position of the cloth relative to the mechanism will be maintained unchanged and additional measurement of the cloth beyond the limit of the measuring capacity of the machine may be had without error in measurement.

2. A cloth measuring machine comprising, a measurement indicator, mechanism including measuring and presser rollers for actuating the indicator by movement of the cloth between said rollers, means for returning the measurement indicator to zero indicating position, means for registering the capacity limit of measurement of the machine upon operating the machine to its capacity limit, and means to hold the cloth against movement with respect to the machine rendered effective upon resetting the measurement indicator to zero indicating position.

3. In a cloth measuring machine, a measurement indicator, mechanism for operating the same including measuring and presser rollers between which cloth may be drawn, means normally acting to reset the measurement indicator to zero indicating position upon release of the presser from the measuring roller, means to release the presser roller from the measuring roller, a brake, means for manually setting the same to hold the measurement indicator from returning to zero indicating position when the measuring and presser rollers are separated, means for holding the cloth against movement upon operating the roller separating means, and means for rendering said cloth holding means ineffective upon operating the brake setting means prior to the operation of the roller separation means.

4. In a cloth measuring machine, a measurement indicator, mechanism for operating the same by cloth including measuring and presser rollers between which the cloth is drawn, means for releasing the presser roller from the measuring roller, spring means normally acting to return the indicator to zero indicating position when the presser roller is released from the measuring roller, a brake, means for setting the same to hold the measurement indicator from zero setting upon release of the measuring and presser rollers, said roller separating means and said brake setting means being independently manually operable, a table over which the cloth passes to said rollers, a clamp, means for moving the clamp against the cloth to clamp it against the table upon the operation of the roller separating means alone, and means for rendering said clamp operating means ineffective upon operation of the brake setting means prior to operation of the roller separation means.

5. A cloth measuring machine including, a measurement indicator, mechanism for actuating the same by longitudinal movement of cloth relative to said mechanism, a housing for said mechanism having an entrance slot through which the cloth moves in operating the machine, a table at the bottom side of the slot, means for zero setting the measurement indicator after an operation of the machine, a clamp mounted above said slot and movable downwardly to bear against cloth in the machine and to secure the cloth against movement between the lower side of said clamp and the table, release means actuated by said measurement indicator for permitting the operation of said clamp and means for operating said clamp.

6. A cloth measuring machine comprising, a measurement indicator, mechanism for operating said indicator by the longitudinal movement of cloth relative to said mechanism and including measuring and presser rollers between which the cloth is drawn to rotate the measuring roller by frictional engagement of cloth therewith, manually operable means for separating the presser roller from the measuring roller, spring means normally tending to return the indicator to zero indicating position when the presser roller is separated from the measuring roller, a brake, independent manually operable means for setting the brake to hold the indicator from returning to zero indicating position, a housing enclosing said mechanism having an entrance slot through which cloth passes between the measuring and presser rollers, a table at the lower side of the entrance slot, a vertically movable clamp mounted above the entrance slot at one side of the housing, means for moving said clamp in a downward direction upon manual operation of the roller separation means, and means for rendering said clamp operating means ineffective upon manual operation of the brake setting means before the manual operation of the roller separating means.

7. In a cloth measuring machine, a measurement indicator, mechanism for operating the same by the longitudinal movement of cloth relative to said mechanism, including measuring and presser rollers between which the cloth is drawn, spring means normally acting to return said indicator and measuring roller to the initial zero position upon separating the measuring and presser rollers after a measurement operation has been performed, manually operable means for separating the presser roller from the measuring roller, means for registering the capacity limit of measurement of a single measuring operation of the machine at the end of a capacity measuring operation, a clamp, means for operating the clamp against the cloth to hold it against movement upon separating the measuring and presser rollers to free the measurement indicator to return to zero indicating position, a brake, means for manually operating the brake to hold the indicator from returning to zero indicating position upon separation of the rollers, means for rendering said clamp actuating means inoperative on setting the brake prior to separating the rollers, and means for zero setting said capacity limit registering means upon setting the brake.

8. A cloth measuring machine, including a measurement indicator, mechanism for actuating the same by the longitudinal movement of cloth relative to said mechanism, said mechanism including measuring and presser rollers between which the cloth is drawn, means for zero setting the indicator, means for securing the cloth against movement, lever means for operating said securing means, means for operating the said lever means, and means for preventing the operating of the lever means except when the zero setting means is operated.

9. In a cloth measuring machine, a measurement indicator, mechanism for operating said indicator including measuring and presser rollers between which cloth is drawn longitudinally, a spring for returning the indicator to zero indicating position when free to do so, said rollers normally operating to hold the indicator at any position to which moved when they are together, manually operable means for separating the presser roller from the measuring roller to thereby free the indicator to return to zero indicating position, a table over which the cloth is drawn, a vertically movable clamp normally located above said cloth, and means disposed between said clamp and said manually operable roller separating means for moving the clamp downwardly against the cloth to press it against said table on separating the rollers and to lift it to its upper position on releasing the presser roller to bear against the measuring roller or cloth between them.

10. In a cloth measuring machine, a measurement indicator, mechanism for operating the same by cloth drawn in the direction of its length and including measuring and presser rollers between which the cloth is drawn, a register for registering the capacity measurement of the machine or a plurality thereof on operating the same to its capacity limit for one measuring operation one or more times, means for moving the register one step at the end of a capacity limit measuring operation, manually operable means for separating the presser roller from the measuring roller, spring means for returning the measurement indicator to zero indicating position when said rollers are separated, a dog for holding the register at any position to which it is operated, a brake, independent manually operable means for setting the brake to hold the measurement indicator at any position to which it has been operated, and means operated by said brake when it is set for releasing the dog and freeing the register to return to zero indicating position combined with a spring for returning said register to zero indicating position when freed from engagement with said dog.

11. A measuring machine comprising, a measurement indicator, mechanism for operating said indicator by the longitudinal movement of cloth relative to said mechanism, including measuring and presser rollers between which the cloth is drawn, manually operable means including a rock shaft for separating the presser roller from the measuring roller, spring means for returning the measurement indicator to initial zero indicating position when the rollers are separated, an arm connected with and movable with said rock shaft and extending radially therefrom, a vertically movable clamping plate mounted above the path of movement of said cloth, a bar located adjacent said arm and at a side of the clamping plate, operative connections between said bar and clamping plate for moving the plate downwardly on movement of the bar in one direction and interengaging means on said arm and bar whereby when said means are interengaged, rocking the shaft when the presser roller is separated from the measuring roller moves said bar longitudinally to force said clamping plate downwardly against the cloth.

12. In a cloth measuring machine, a measurement indicator, mechanism for operating the same by the longitudinal movement of cloth relative to said mechanism, including measuring and presser rollers between which the cloth is drawn, manually operable means including a rock shaft for separating the presser roller from the measuring roller, spring means for returning the measurement indicator to initial zero indicating position when the presser roller is separated from the measuring roller, an arm extending from said rock shaft and movable therewith, a clamping plate mounted for vertical movements over the path of movement of the cloth, a substantially horizontal longitudinal movable floating bar adjacent said arm and alongside the clamping plate, means connecting the bar with the clamping plate for moving it vertically on longitudinal movement of said bar, said bar adjacent said arm having a recess in its lower side, a block projecting from the arm below said recess, means normally engaging with the front end of said arm to hold it at its rear end above said block and with the block out of said recess, means for automatically releasing said bar at its front end upon attainment of the capacity limit of measurement for one measuring operation on said machine whereby said bar at its rear end lowers and the block on said arm is received in said recess thereby causing said bar to be moved longitudinally and the clamping plate to be moved downwardly on manual operation of the presser roller separating means.

13. A construction containing the elements in combination defined in claim 12, combined with a brake, means for manually setting said brake, and means operated by said manually operable brake setting means and interposed between the brake setting means and said floating bar for supporting the rear end of said floating bar when the brake is set and holding the recess in said floating bar above said block.

14. In a cloth measuring machine, a measurement indicator, mechanism for driving the same by cloth drawn longitudinally through said mechanism, said mechanism including a measuring and a presser roller between which the cloth is drawn, means for returning the measurement indicator to initial zero indicating position upon separating the presser roller from the measuring roller, manually operable means for separating the measuring roller from the presser roller, a clamping plate mounted for vertical sliding movements over the path of movement of the cloth, a floating bar located alongside of the clamping plate and extending at one end to the front of the machine and at its rear end toward said roller separating means, means connecting the floating bar between its ends to said clamping plate, whereby the clamping plate is moved vertically on lengthwise movement of said floating bar, means normally engaging the front end of the floating bar to hold the rear end thereof out of operative engagement with said presser roller separating means, means for releasing said holding means upon operating the measuring machine to its limit of capacity of measurement for a single measuring operation, thereby permitting the rear end of said bar to drop to a lower position and interengaging means between the rear end of said bar and the manually operable roller separating means rendered operative on downward dropping of the rear end of said floating bar for moving said floating bar longitudinally upon separating the rollers when the capacity limit of measurement of said machine is reached and the rollers separated.

15. A construction containing the elements in combination defined in claim 14, combined with a brake, independent manually operable means for setting said brake to thereby hold the measurement indicator at any position to which operated, and means interposed between said brake setting means and said floating bar and actuated by the operation of said brake setting means to hold the rear end of the floating bar in an upper position, whereby operative connection between the roller separating means and said floating bar is prevented by manual operation of the brake setting means prior to the manual operation of the roller separating means.

16. In a cloth measuring machine, a measurement indicator, mechanism for driving said indicator including a measuring roller and a presser roller between which cloth is drawn in the direction of its length, a spring for zero setting the indicator when free to do so, manually operable means to free the indicator for return to zero indicating position under the influence of said spring, holding means, means enabling the holding means to become effective at the end of any capacity limit of measurement for a single measuring operation of said machine, for holding the cloth against movement while the measurement indicator is returning to its zero indicating position, and means connected to and operated by the said manually operable means for operating the holding means.

17. In a cloth measuring machine, a measurement indicator, mechanism for operating the measurement indicator including measuring and presser rollers between which the cloth may be drawn, means for resetting the measurement indicator to zero indicating position upon separating the measuring from the presser roller, means for separating the measuring roller from the presser roller, a clamp adapted to hold the cloth against movement with respect to said rollers, means effective to actuate said clamp and means to render the last mentioned means effective only when said measurement indicator is at a certain predetermined position.

In testimony whereof I affix my signature.

ANTHONY VANDERVELD.